United States Patent
Parish et al.

[15] 3,645,680
[45] Feb. 29, 1972

[54] CONCENTRATING FLUOSILICIC ACID

[72] Inventors: William R. Parish; James C. Kelley, both of Lakeland, Fla.

[73] Assignee: Wellman-Lord, Inc.

[22] Filed: Mar. 9, 1970

[21] Appl. No.: 17,611

[52] U.S. Cl. .................................. 23/153, 23/167, 23/182, 23/205
[51] Int. Cl. .................. C01b 7/00, C01b 33/12, C01b 33/08
[58] Field of Search ....................... 23/153, 88, 182, 167, 205

[56] References Cited

UNITED STATES PATENTS

| | | | |
|---|---|---|---|
| 3,218,124 | 11/1965 | Oakley, Jr. et al. | 23/153 |
| 3,218,126 | 11/1965 | Wilkinson | 23/153 |
| 3,218,128 | 11/1965 | Klem | 23/153 |
| 1,960,347 | 5/1934 | Osswald et al. | 23/153 |
| 2,456,509 | 12/1948 | Hopkins, Jr. et al. | 23/153 |
| 3,415,039 | 12/1968 | Rushton et al. | 23/153 X |
| 3,233,969 | 2/1966 | Heller et al. | 23/182 |
| 3,218,125 | 11/1965 | Houston et al. | 23/153 |

Primary Examiner—Edward Stern
Attorney—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

A process for the concentration of aqueous fluosilicic acid solutions is disclosed. In the process, a concentrated aqueous fluosilicic acid solution is premixed with concentrated sulfuric acid under superatmospheric pressure and elevated temperatures; the mixture is introduced to a reduced pressure, high-temperature dehydration zone to release a gaseous overhead containing essentially all of the silicon tetrafluoride formed by the dehydration of the fluosilicic acid and a liquid sulfuric acid bottoms containing essentially all of the hydrogen fluoride thereby produced; the gaseous overhead is passed to an aqueous scrubbing zone to effect reaction of the silicon tetrafluoride with the water content of a dilute, aqueous fluosilicic acid scrubbing solution and thereby yield a concentrated, aqueous fluosilicic acid solution. The concentrated fluosilicic acid solution is recovered and part is recycled for use as the fluosilicic acid solution which is mixed with the concentrated sulfuric acid. Advantageously, the dilute sulfuric acid bottoms is contacted with a siliceous material to convert the hydrogen fluoride therein to another silicon tetrafluoride-containing gaseous overhead which is also passed to the scrubbing zone to effect further concentration.

15 Claims, 1 Drawing Figure

PATENTED FEB 29 1972
3,645,680
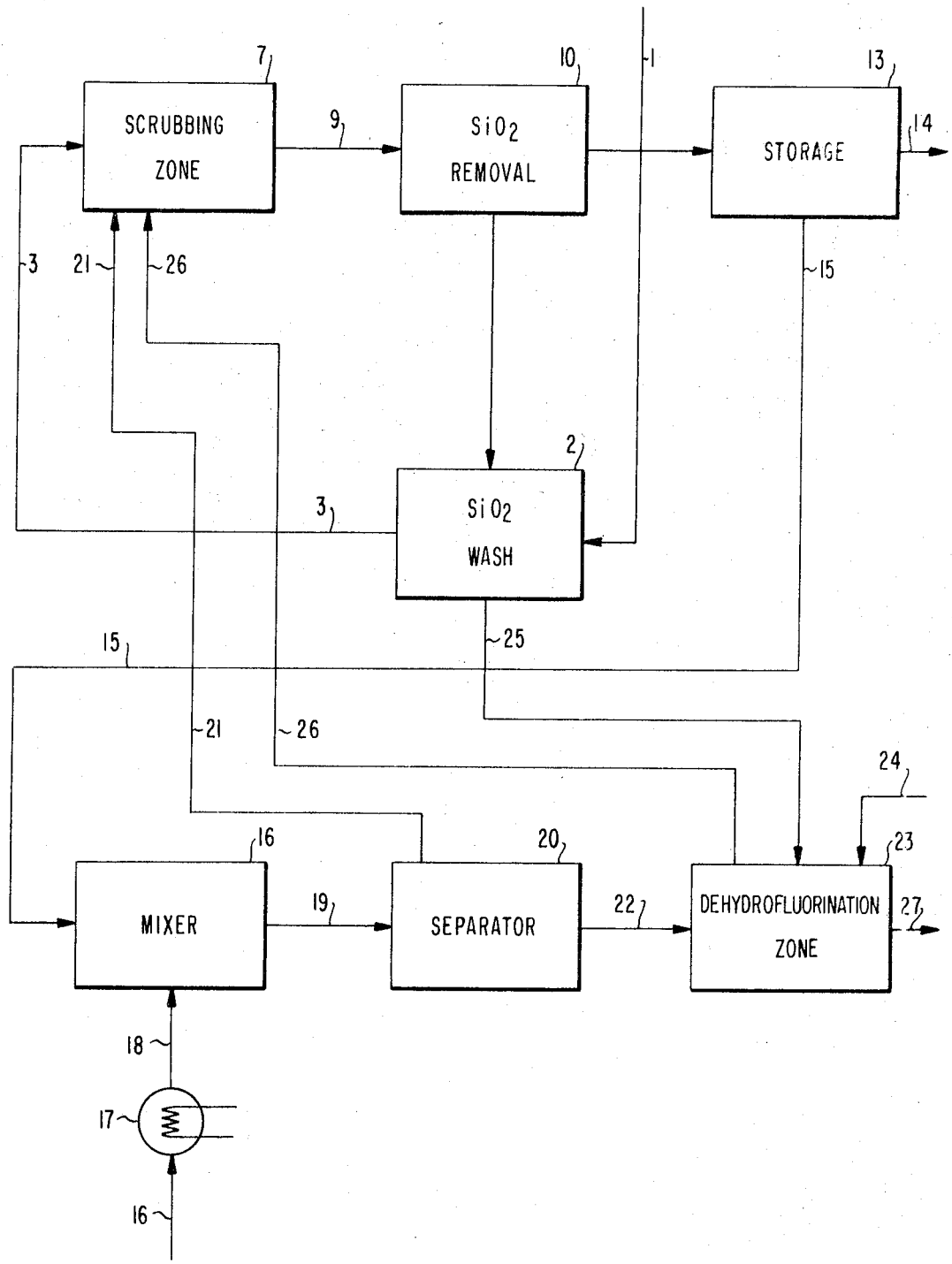
INVENTORS
WILLIAM R. PARISH
JAMES C. KELLEY
BY McLean, Morton & Boustead
ATTORNEYS

CONCENTRATING FLUOSILICIC ACID

This invention relates to a process for the concentration of dilute aqueous solutions of fluosilicic acid by contacting same with silicon tetrafluoride produced by the dehydration of fluosilicic acid by concentrated sulfuric acid. Dilute sulfuric acid solutions suitable for phosphoric acid manufacture are also produced.

The process of this invention comprises mixing sulfuric acid, including oleum, having a concentration of at least about 85 weight percent $H_2SO_4$ with a concentrated aqueous solution of fluosilicic acid containing from about 20 to 70 weight percent $H_2SiF_6$ to dehydrate the fluosilicic acid and dilute the sulfuric acid, passing the acid mixture into a reduced pressure hydration zone maintained at a temperature of from about 200 to 250° F. whereby $SiF_4$ from the dehydration of the fluosilicic acid is evolved as a gaseous overhead and passed to a scrubbing zone and HF from the dehydration of the fluosilicic acid remains essentially in solution with the dilute sulfuric acid, passing the HF-containing $H_2SO_4$ to a spent acid holding tank where it is contacted with $SiO_2$, preferably at least part of which is supplied by $SiO_2$ from the silica separation zone described below, to react with the HF to produce an $SiF_4$-containing gaseous overhead, passing the $SiF_4$-containing gaseous overhead to the scrubbing zone, withdrawing dilute sulfuric acid from the spent acid holding tank, contacting an aqueous dilute solution of fluosilicic acid containing about 10 to 30 weight percent $H_2SiF_6$ and about 70 to 90 weight percent water with the $SiF_4$-containing gaseous overheads (from the dehydration zone and spent acid holding tank) in the scrubbing zone to form a concentrated aqueous solution of fluosilicic acid, recovering the concentrated solution from the scrubbing zone and recycling part of it to the mixing zone to be mixed with the sulfuric acid. The concentrated fluosilicic acid solution can be passed to a silica separation zone to remove precipitated silica prior to recovery and recycling. The separated silica can be washed with the dilute, aqueous fluosilicic acid solution to be used as the scrubbing solution in the scrubbing zone to remove any absorbed, concentrated $H_2SiF_6$ solution, and the washed silica can then be passed to the spent acid holding tank for contact with, and dehydrofluorination of, the dilute sulfuric acid removed as bottoms from the dehydration zone.

The dilute aqueous solution of fluosilicic acid introduced into the process of this invention has a composition normally ranging from 10 to 30 weight percent $H_2SiF_6$ and 70 to 90 weight percent water. Such dilute, aqueous fluosilicic acid solutions are normally produced as a byproduct in phosphoric acid manufacture.

The silica wash vessel wherein the dilute, aqueous fluosilicic acid solution contacts silica separated from the concentrated fluosilicic acid product solution, produced as described below, can be any suitable liquid-solid contact apparatus. The dilute, aqueous fluosilicic acid washing solution removes any absorbed concentrated fluosilicic acid on the silica. The dilute fluosilicic acid solution is then passed into the scrubbing zone for concentration of its fluosilicic acid content.

The concentrating of the fluosilicic acid scrubbing solution in the scrubbing zone is accomplished by the occurrence of the following reaction:

(1) $3SiF_4 + 2H_2O$ 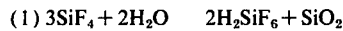 $2H_2SiF_6 + SiO_2$

The scrubbing zone is normally maintained within the temperature range of about 75 to 150° F., preferably below about 120° F. The scrubbing zone can be supplied by any suitable gas-liquid contacting vessel as, for example, one or more spray towers. Any silicon tetrafluoride gases passing through the scrubbing zone unreacted may be routed to a second such scrubbing zone in order to decrease $SiF_4$ losses.

The concentrated fluosilicic acid leaving the scrubbing zone is treated to remove its precipitated silica content. The separation of the silica from the fluosilicic acid product solution is accomplished in a silica separation zone, for example, by centrifugation, filtration or decantation. The separated silica may then be washed with dilute fluosilicic acid, as hereinbefore described, to remove absorbed concentrated fluosilicic acid. The separated, washed silica may be then used in the silica treatment of the dilute sulfuric acid bottoms in the hold tank to transform hydrogen fluoride to silicon tetrafluoride.

The fluosilicic acid solution removed from the silica separation zone is the concentrated, aqueous fluosilicic acid solution product of this invention. The concentrated product usually is at a temperature of about 75 to 125° F. and normally about 90 to 100° F. This product can then be passed to a suitable storage zone. The concentrated fluosilicic acid solution, prepared by the process of this invention has fluosilicic acid content ranging from about 20 to more than about 70 percent by weight, depending upon the particular feed and other process variables. The fluosilicic acid concentration of the concentrated solution product is always greater than the fluosilicic acid concentration of the dilute solution feed. Normally, the product will have a fluosilicic acid content of about 40 to 60 percent by weight. Part of this concentrated solution can be immediately recovered as product, while part is conveyed to the pressurized mixing zone to be dehydrated with the concentrated sulfuric acid.

The concentrated aqueous solution of $H_2SiF_6$ is mixed with strong sulfuric acid having a concentration generally from about 85 to 100, preferably about 90 to 99, weight percent of sulfuric acid. Preferably, the sulfuric acid and concentrated aqueous fluosilicic acid are each preheated to about 90 to 240° F., prior to their being mixed together. The weight ratio of the acids is such that the spent acid mixture, after the dehydration step described hereinafter, has a sulfuric acid concentration of at least about 70 weight percent and advantageously about 70 to 95 weight percent. The weight ratio on an anhydrous basis is thus normally at least about 5 to about 30 parts, preferably about 15 to 20 parts, sulfuric acid per part of fluosilicic acid.

The mixing of the two acids is carried out under superatmospheric pressure for a time to allow substantially complete mixing of the acids. The temperature of the mixture can range from ambient up to about 225 or 250° F. Preferably, the temperature of the mixture will reach the temperature of the liquid in the dehydration zone, which is hereinafter discussed. The time required for the acid mixture to reach such a temperature will often be about 0.1 to 10 seconds or more. The amount of pressure employed is at least that which is sufficient to prevent the water in the acid mixture from evaporating to react with the silicic component evolving from the mixture which can result in the production of a substantial amount of silicon dioxide, commonly referred to as "silica." For example, at about atmospheric pressure and elevated temperatures comparable to those herein, $SiF_4$ (from the fluosilicic acid) and water can react to form silica. The formation of silica is essentially avoided in the process of the present invention by maintaining the pressure above atmospheric, e.g., at least about 5 pounds per square inch gauge (p.s.i.g.) and preferably about 5 to 10 or 15 p.s.i.g.

The pressurized mixture of the sulfuric acid and fluosilicic acid is next introduced into a separation zone maintained at lower pressure than the mixture zone, whereby a gaseous overhead is evolved and liquid bottoms are formed. The temperature of the liquid in the separation zone is normally about ambient to about 225 or 250° F., often about 190 to 225° F., and thus is below the boiling point of the sulfuric acid in the zone. The pressure in the dehydration zone is sufficiently below that of the pressurized mixture zone so as to allow gas-liquid separation. Atmospheric pressure is normally advantageous. The gaseous overhead produced in the separation zone contains essentially all of the silicon tetrafluoride produced from the mixture of the sulfuric and fluosilicic acids. Essentially all of the hydrogen fluoride produced is present in the dilute sulfuric acid bottoms.

The separation zone is preferably one which allows the mixture to be sufficiently dispersed such that it has at least about one, preferably at least about 20, or even at least about 40, square centimeters of liquid-gas interface per cubic centimeter of liquid. In other words, the vessel which houses the dehydration zone is one which provides a large surface area for the liquid, examples of such being spray towers, falling film evaporators, wiped film evaporators, forced circulation evaporators or any highly agitated vessel. In a falling film evaporator, for instance, there can often be obtained about 20 to 40 square centimeters of liquid-gas interface per cubic centimeter of liquid.

The desired temperature can usually be maintained in the separation zone without the application of external heat. As mentioned above, it is preferred that the entering mixture of acids already be up to the desired separation zone temperature. The temperature in the separation zone depends mainly upon the inlet temperature of both solutions, the heat of dilution of sulfuric acid and the heat of vaporization of the $SiF_4$ gas. The heat of vaporization of the $SiF_4$ gas tends to counterbalance the heat of dilution of the sulfuric acid. By preheating either or both acids and by maintaining them in pressurized admixture with one another for a sufficiently long time, the objective of bringing them up to separation zone temperatures is greatly facilitated.

The residence time of the mixture in the separation zone is relatively short, ranging, for example, from about 0.1 minute to about 80 minutes, preferably about 0.5 to 5 minutes. The fluosilicic acid is dehydrated during the time beginning with its admixture with the concentrated sulfuric acid and extending to its residence in the separation zone, and the sulfuric acid is correspondingly diluted. Hydrogen fluoride and silicon tetrafluoride are the products of the dehydration of fluosilicic acid. As noted before, silicon tetrafluoride exits the dehydration zone as substantially anhydrous gaseous overhead. The hydrogen fluoride remains in solution and is removed with the bottoms, which bottoms have a sulfuric acid content of at least about 70, often about 70 to 95, percent, based on the combined weight of water and sulfuric acid. This concentration can be controlled by adjusting the ratio of the sulfuric acid to the fluosilicic acid in the pressurized mixture introduced to the separation zone.

The dilute sulfuric acid bottoms are passed to a spent acid hold tank and maintained at a temperature below the boiling point of the sulfuric acid, normally within the range of about 100 to 300° F., at essentially atmospheric pressure. In the hold tank, the dilute sulfuric acid bottoms may be treated with a siliceous material such as sand, precipitated silica, or diatomaceous earth, advantageously under turbulent conditions, to convert any hydrogen fluoride present to silicon tetrafluoride, which has low solubility in the treated, dilute sulfuric acid bottoms. The amount of silica added to the spent acid hold tank is preferably at least about stoichiometric to the amount of HF in the sulfuric acid. At least part of the silica added can be provided from the silica separation zone as disclosed before.

The amount of sulfuric acid in the dilute sulfuric acid bottoms is advantageously above about 65 percent, based on the combined weight of water and sulfuric acid. Above about 65 weight percent sulfuric acid, the silica treatment effects dehydrofluorination to give silicon tetrafluoride as the product, as follows: (2) $4HF + SiO_2 \rightarrow SiF_4 + 2H_2O$
However, below about 65 weight percent sulfuric acid, the reaction proceeds as follows: (3) $6HF + SiO_2 \rightarrow H_2SiF_6 + 2H_2O$
Thus, the concentration of the sulfuric acid in the sulfuric acid bottoms to be silica treated should advantageously be above about 65 weight percent, preferably above about 70 weight percent, so that silicon tetrafluoride is produced. The silicon tetrafluoride is removed as a gaseous overhead; this product is directly converted into fluosilicic acid in the scrubbing zone described above.

The fluorine level present in the dilute sulfuric acid bottoms after silica treatment is normally less than about 0.2 percent by weight. This low fluorine, dilute sulfuric acid bottoms can be useful in phosphoric acid manufacture and sometimes may also be admixed with concentrated sulfuric acid to form a suitable sulfuric acid feed for the present concentration process.

The gaseous overhead from the separation zone, containing essentially all of the silicon tetrafluoride from the dehydration of the fluosilicic acid feed, and the gaseous overhead from the spent acid hold tank, produced from the dehydrofluorination of the dilute sulfuric acid bottoms from the separation zone, are contacted with the dilute, aqueous, fluosilicic acid solution in the scrubbing zone as disclosed above.

The invention may be more readily understood with reference to the accompanying drawing in which the FIG. is a flowsheet depicting a preferred embodiment of the process of this invention.

Referring to the FIGURE a dilute, e.g., from about 10 to 30 weight percent concentration, aqueous solution of $H_2SiF_6$ enters the process through line 1 and is passed into silica wash vessel 2 where the dilute solution washes the silica removed from the concentrated aqueous solution of fluosilicic acid, as hereinafter described, to remove from the silica any absorbed concentrated $H_2SiF_6$ present. The spent wash solution is then passed through line 3 to scrubbing zone 7 where the dilute, aqueous solution is contacted with silicon tetrafluoride from the separation zone and spent acid holding tank, as explained below, to produce a concentrated, e.g., 20 to 70 percent, preferably 40 to 50 percent, aqueous solution of $H_2SiF_6$. The gases from scrubbing zone 7 can be conveyed to a second such scrubbing zone (not shown) to ensure substantially complete removal of silicon tetrafluoride. The slurry of silica in concentrated $H_2SiF_6$ solution is passed via line 9 to the silica separation zone 10 wherein the precipitated silica is removed from the concentrated solution. The silica from the separation zone 10 is conveyed via line 11 to silica wash vessel 2 for contact with the dilute $H_2SiF_6$ solution as explained above. The silica-free, concentrated $H_2SiF_6$ solution is passed via line 12 to concentrated product storage tank 13. Part of the concentrated $H_2SiF_6$ solution can be removed via line 14 for product recovery. The remaining part is conveyed via line 15 to mixing tee 16 where it is mixed with a concentrated, e.g., 85 to 100 percent, preferably 90 to 95 percent solution of $H_2SO_4$. The mixer is operated at superatmospheric pressure of from about 5 to 10 or 15 p.s.i.g. to prevent the water present from reacting with the $SiF_4$ to produce silica. The mixer is also maintained at a temperature of from about 90 to 240° F. The sulfuric acid is supplied via line 16, heater 17 and line 18 to the mixing tee at about the temperature of the liquid in the mixer.

The weight ratio (anhydrous) of sulfuric acid to fluosilicic acid in the mixture is from about 5:1 to 30:1. The mixture of acids is conducted via line 19 under about 5 to 15 p.s.i.g. pressure to the separator 20, which can be a falling film type of evaporator. Residence time in line 19 is about 5 seconds and the mixture enters the separator at about 200 to 250° F., which is approximately the temperature of the liquid in the separator. $SiF_4$ gas flashes off under the approximately atmospheric pressure conditions maintained in the separator and is removed via line 21. Dilute sulfuric acid (about 80 to 85 weight percent concentration) is withdrawn as bottoms via line 22. Residence time of the reactants in the separator is about 2 to 5 minutes.

The dilute sulfuric acid bottoms in line 22 are passed to the spent acid hold tank 23 in which the acid is treated with a siliceous material, such as sand, introduced through line 24 and from silica wash vessel 2 through line 25. The silica-treated acid mixture is maintained under turbulent conditions, as by a stirrer (not shown), at a temperature of from about 200 to 300° F. and at essentially atmospheric pressure. The silica reacts with any hydrogen fluoride present to produce silicon tetrafluoride which is removed as gaseous overhead through line 26. The amount of silica introduced is at least about stoichiometric to the amount of HF in the dilute sulfuric acid bottoms. The silica-treated, dilute sulfuric acid of a concentration of about 60 to 90 percent weight percent can be removed through line 27 for ultimate recovery.

The following example describes a preferred procedure for accomplishing the concentration process of this invention.

EXAMPLE

The process flow for this example is illustrated by the FIGURE By this procedure, substantially pure (i.e., the precipitated silica has been removed) concentrated fluosilicic acid is prepared. The process conditions are as follows:

|  |  | Weight % |
|---|---|---|
| 1. Feed: | | |
| 25% $H_2SiF_6$, concentration | $SiF_4$ | 8.70 |
| | HF | 18.31 |
| | $H_2O$ | 72.99 |
| | | 100.00 |
| 93% $H_2SO_4$, concentration | $H_2SO_4$ | 93.25 |
| | $H_2O$ | 6.75 |
| | | 100.00 |
| 2. Fluosilicic acid temperature prior to mixing | | 150° F. |
| 3. Sulfuric acid temperature prior to mixing | | 200° F. |
| 4. Separation zone temperature | | 205° F. |
| 5. $H_2SO_4$ concentration of spent acid from separation zone | | 71.00% |
| 6. $H_2SO_4$ concentration of spent acid from silica treatment | | 65.00% |
| 7. Scrubbing liquid temperature in the scrubbing zone | | 100°–120° F. |
| 8. Product strength, $H_2SiF_6$ | | 36% |
| 9. Product temperature | | 90°–100° F. |

What is claimed is:

1. A process for concentrating dilute, aqueous fluosilicic acid solution containing about 10 to 30 weight percent $H_2SiF_6$, which process comprises:
   i. scrubbing gaseous silicon tetrafluoride which is obtained as overhead from the separation and dehydrofluorination zones hereinafter described with said dilute solution of fluosilicic acid in a scrubbing zone to effect reaction between said silicon tetrafluoride and the water of the dilute, fluosilicic acid scrubbing solution to form, as spent scrubbing liquid, a slurry of precipitated silica in an aqueous solution of fluosilicic acid which is more concentrated than said dilute fluosilicic acid scrubbing solution and which contains about 20 to 70 weight percent $H_2SiF_6$;
   ii. separating the silica from the concentrated aqueous fluosilicic acid solution produced in the scrubbing zone;
   iii. mixing sulfuric acid having a concentration of above about 85 weight percent with a portion of the concentrated fluosilicic acid to effect dehydration of the fluosilicic acid and dilution of the sulfuric acid, said mixing being effected under superatmospheric pressure for a time sufficient to allow substantially complete mixing of the acids, said pressure being sufficient to prevent the water in the mixture from evaporating to react with the silicic component evolving from the mixture which can result in the production of a substantial amount of silica;
   iv. introducing the mixture into a reduced pressure separation zone whereby silicon tetrafluoride is evolved as a gaseous overhead which is removed and hydrogen fluoride and dilute sulfuric acid are produced and withdrawn as bottoms, the temperature of the liquid in said zone being maintained at about ambient to 250° F.; and
   v. treating the hydrogen fluoride-containing dilute sulfuric acid bottoms in a dehydrofluorination zone with a siliceous material to release the hydrogen fluoride therein as a silicon tetrafluoride-containing gaseous overhead, while maintaining the dehydrofluorination zone temperature at less than the boiling point of the sulfuric acid solution therein.

2. The process of claim 1 wherein the temperature of the separation zone is about 190 to 225° F.

3. The process of claim 1 wherein the sulfuric acid is mixed with the fluosilicic acid in step (iii) in an anhydrous weight ratio of about 5 to 30:1, sufficient to provide the dilute sulfuric acid bottoms in step (iv) with at least about 65 percent sulfuric acid, based on the combined weight of water and sulfuric acid.

4. The process of claim 3 wherein in step (iii), prior to the mixing, the sulfuric acid and fluosilicic acid are each at a temperature of about 90 to 240° F.

5. The process of claim 2 wherein the separated silica from step (ii) is at least part of the siliceous material added to the hydrogen fluoride-containing dilute sulfuric acid bottoms to release the hydrogen fluoride as silicon tetrafluoride in the dehydrofluorination zone.

6. The process of claim 5 wherein separated silica is washed with the dilute, aqueous fluosilicic acid solution before addition to the hydrogen fluoride-containing dilute sulfuric acid bottoms.

7. The process of claim 1 wherein the pressure in step (iii) is at least about 5 pounds per square inch gauge.

8. The process of claim 1 wherein the sulfuric acid employed in step (iii) has a concentration of above about 90 weight percent sulfuric acid.

9. The process of claim 1 wherein, in step (iii), the mixing under superatmospheric pressure is conducted for a time sufficient to allow the temperature of the mixture to reach at least about the temperature of the liquid in the reduced pressure separation zone.

10. The process of claim 1 wherein the sulfuric acid is mixed with the fluosilicic acid in step (iii) in an anhydrous weight ratio of about 5 to 30:1, sufficient to provide the dilute sulfuric acid bottoms of step (iv) with at least about 70 percent sulfuric acid, based on the combined weight of water and sulfuric acid.

11. The process of claim 1 wherein the pressure in step (iii) is at least about 10 p.s.i.g.

12. The process of claim 1 wherein, in step (iii), the mixing under superatmospheric pressure is conducted for about 0.1 to 10 seconds.

13. The process of claim 1 wherein the mixture in the separation zone in step (iv) is sufficiently dispersed that it has at least about one square centimeter of liquid gas interface per cubic centimeter of liquid.

14. The process of claim 1 wherein, in step (iv), the mixture has a residence time in the separation zone of about 0.1 to 80 minutes.

15. The process of claim 1 wherein, in step (iv), the mixture has a residence time in the separation zone of about 0.5 to 5 minutes and is sufficiently dispersed in the zone that it has at least about 20 square centimeters of liquid gas interface per cubic centimeter of liquid.

* * * * *

UNITED STATES PATENT OFFICE
CERTIFICATE OF CORRECTION

Patent No. 3,645,680　　　　　　　　Dated February 29, 1972

Inventor(s) William R. Parish and James C. Kelley

It is certified that error appears in the above-identified patent and that said Letters Patent are hereby corrected as shown below:

Column 1, after the title, should be inserted

--Other applications, commonly owned herewith, concerning processes of treating fluosilicic acid are U. S. Serial No. 812,229, filed April 15, 1969; U. S. Serial No. 17,590, filed March 9, 1970; and U. S. Serial No. 17,580, filed March 9, 1970.--

Column 1, line 62, equation 1 should read $$--3SiF_4 + 2H_2O \longrightarrow 2H_2SiF_6 + SiO_2--.$$

Column 3, line 61, equation 2 should read $$--4HF + SiO_2 \longrightarrow SiF_4 + 2H_2O--.$$

Column 3, lines 63-64, equation 3 should read $$--6HF + SiO_2 \longrightarrow H_2SiF_6 + 2H_2O--.$$

Column 6, line 53, "liquid gas" should read --liquid-gas--.

Column 6, line 61, "liquid gas" should read --liquid-gas--.

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents